June 6, 1967      J. G. MacARTHUR      3,324,458
MONITORING APPARATUS
Filed May 18, 1964      3 Sheets-Sheet 1

INVENTOR
JOHN G. MacARTHUR
BY Arthur Frelich
ATTORNEY

3,324,458
MONITORING APPARATUS
John Gerard MacArthur, Los Angeles, Calif., assignor, by mesne assignments, to The Bunker-Ramo Corporation, Stamford, Conn., a corporation of Delaware
Filed May 18, 1964, Ser. No. 368,214
13 Claims. (Cl. 340—172.5)

This invention relates to improvements in apparatus useful for monitoring computer controlled processes.

In order to properly control complex modern-day industrial processes, the condition of a great number of process variables must be periodically compared with predetermined conditions. Thus, in an electric power generating system for example, the pressure in a steam generator must be periodically checked to see if it is within optimum limits. Simpler and more complex interrogations of other system variables are also required. Thus, it may be necessary to periodically perform a simple interrogation to determine whether or not a particular switch is closed. Such a determination of course requires that a mere binary decision be made. More complex interrogations could be required such as, for example, determining whether or not a particular switch is closed, and if it is not, again determining the condition of that same switch on a predetermined number of other occasions spaced in time by predetermined intervals.

In the monitoring of industrial processes, alarm conditions are generally established when the actual or determined condition does not satisfactorily match the predetermined condition. Thus, where the pressure in the steam generator is out of limits, an alarm condition can be established; or, if a switch is open when it is supposed to be closed, an alarm condition can be established; or, if a switch continues to be open after its condition is examined on a predetermined number of different occasions spaced by predetermined intervals, an alarm condition can be established.

The monitoring of industrial processes in accordance with the foregoing, can be readily accomplished manually. That is, an operator can perform a sequence of operations which involve comparing a meter reading with predetermined standards or looking at the position of a switch either once or on several occasions spaced by certain intervals. It has been recognized though, that inasmuch as virtually all of the decisions required to properly monitor an industrial process are essentially binary in nature, they can very readily and conveniently be accomplished by digital data processing or computer apparatus. Thus, many industrial processes are today controlled by digital computers. The computers can perform essentially the same function performed by an operator in an manual monitoring system except that, of course, digital computers are able to perform these functions much more rapidly. Because of this, computers can, for all intents and purposes, monitor several interrogation sequences at the same time. In actuality, the interrogations of each of the sequences can be interleaved but because of the speed of the computer, relative to the speed at which a human operator can perform, the sequences can be considered as being performed simultaneously. Consequently, although monitoring is generally much more effective when performed by digital computers, limited difficulties are encountered when alarm conditions are established and it is necessary to communicate the nature of the alarm to an operator.

Most prior art control systems incorporating a computer employ a print-out device which enables the computer to generate typed data which refers the operator to the particular alarming interrogation. In order to clear the alarm condition, the operation is usually desirous of knowing the nature of the interrogations in the same sequence which preceded or are to follow the alarming interrogation. Although the operator could possibly consult a book of master flow charts to obtain this information, reference to such a book is a relatively time consuming task. The task of course is even further aggravated when two alarm conditions are established almost simultaneously. Consequently, it is an object of the present invention to provide an improved monitoring system for better enabling an operator to respond to an established alarm condition.

Briefly, the invention herein is directed toward the provision of means responsive to computer control for presenting a visual display of an interrogation sequence flow chart containing an alarming interrogation and, in addition, toward the provision of means for specifically identifying the alarming interrogation in the displayed flow chart.

In accordance with the preferred embodiment of the invention, a plurality of transparencies, such as slides, are provided, each slide having provided thereon an image of at least a portion of an interrogation sequence flow chart. The slides are mounted in a magazine of a slide projector which is responsive to computer output signals for causing a particular slide to be displayed. In the course of normally controlling an industrial process, the computer will sequentially access information from its memory which information identifies a particular interrogation to be performed. The accessing of this information, which can be referred to as an interrogation instruction, in turn initiates the performance of a subroutine which ultimately provides a signal indicating whether an alarm condition should be established or whether the next interrogation instruction in the sequence should be processed. In the event an alarm condition should be established, a table in the computer is consulted to determine which slide carries the flow chart including the alarming interrogation. The identified slide is then visually displayed for the operator. A tag in each interrogation instruction identifies its position in its interrogation sequence and in response to this tag, the particular portion of the displayed flow chart is identified to the operator. Thus, the operator is able to take whatever action is deemed necessary to clear the alarm condition.

It is pointed out that although the preferred embodiment of the invention is directed to a process controlled by a digital computer, the invention is equally as applicable to processes controlled by means employing other types of computation such as analog computation.

The novel features that are considered characteristic of the invention are set forth with particularity in the appended claims. The invention itself both as to its organization and method of operation, as well as additional objects and advantages thereof, will best be understood from the following description when read in connection with the accompanying drawings, in which:

Figure 1:
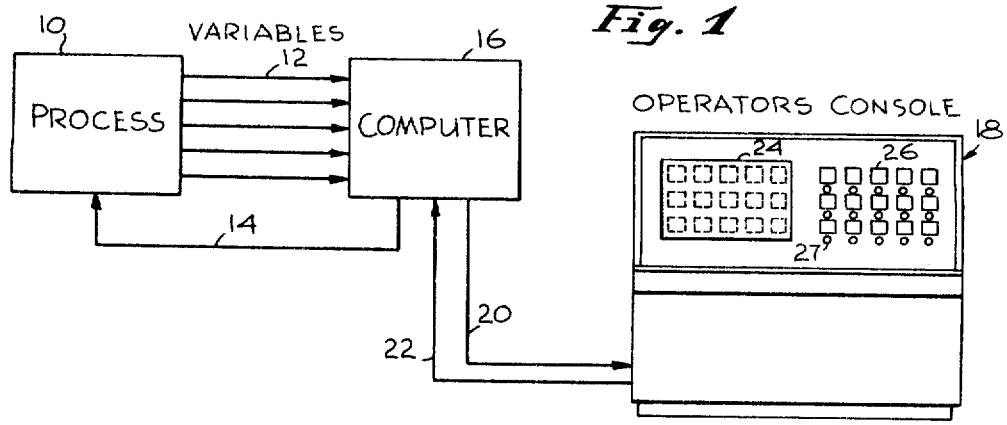
FIGURE 1 is a block diagram illustrating a computer controlled process monitored by an embodiment of the present invention.

Attention is now called to FIG. 1 of the drawings in which a block 10 is utilized to represent a process in which several variables 12 can be measured and expressed quantitatively, and in which control signals can be applied via a control channel 14 to adjust process parameters for directly or indirectly effecting the variables 12. Thus, the term process as used herein can include many diverse industrial processes, such as the manufacture of steel or the generation of electrical power, and can further include much simpler systems in which it is merely desired to determine the condition of a plurality of different switches (i.e. the variables) prior to performing other tasks.

Many years ago, it was recognized that a multitude of processes employed in military, industrial, and other systems, could be efficiently monitored and controlled by a digital computer operating in accordance with an appropriate stored program. Thus, as a typical and more concrete example, consider generally the requirements of a system for monitoring the operation of an electrical power generating facility. In any major power generating facility employing large steam generators and turbines, it is essential to check various process variables periodically in order to determine whether adjustments are necessary. For example only, the pressure and temperature of the steam generated and other measurable variables should be determined to assure that the system is operating at optimum efficiency for the particular load condition. In response to measured load changes, it is normally necessary to change certain process parameters to maintain optimum operating efficiency. It is also necessary to periodically monitor a variety of variables which, at certain quantitatively measurable values, could present hazardous conditions. Thus, the pressure in certain portions of the process apparatus may have to be maintained below a certain value in order to prevent rupturing of the apparatus. From the very little that has been said thus far, it should be appreciated that the successful monitoring of a relatively complex process, can in itself be very complex. The monitoring complexity is even further increased when it is realized that different conditions have to be satisfied during certain operational phases (e.g. start-up and shut-down) than have to be satisfied during running periods.

Regardless of the complexity of any particular process, the general approach to monitoring that process will very likely be the same. That is, simply stated, all measurable process variables can be periodically interrogated and compared with predetermined values in accordance with some predetermined sequence. In response to the comparisons, process parameters can be adjusted or, in other instances, it may be preferable to merely notify some supervisory authority or in other words, establish an alarm condition. The monitoring approach thus generally described can be performed by human operators directly in the sense that the operators can read instruments describing the values of measured variables and can compare these readings with predetermined values in some table. A digital computer can also perform the same monitoring functions performed by the operators and can in many significant respects do a much better monitoring job inasmuch as, because of its speed, it can more easily take into account the interrelationships between various variables. Like the human operator, the digital computer can also establish alarm conditions, as directed by its stored operating program, in the event certain situations are encountered. FIG. 1 illustrates a digital computer 16 to which are applied representations of the process variables 12 and which in turn can apply control signals over the channel 14 to the process 10.

The computer 16 of FIG. 1, as is taught in many prior art systems, can store in its memory a series of instructions which cause it to perform certain operations in order to make appropriate determinations as to whether the process should be adjusted or whether an alarm condition should be established. The actual computer instructions are usually processed sequentially with means, as are well known in the prior art, being included in the computer for jumping or branching or, in other words, modifying its operational sequence dependent upon the occurrence of certain conditons. The actual computer instructions stored within the memory of the computer 16 cause the computer to run through the steps of an interrogation sequence. It of course should be appreciated by those having knowledge of the computer art, that a great number of computer instructions may actually have to be processed in order to execute a single interrogation. For example, if the comparison between the temperature of a steam generator output and a stored value is considered as a single interrogation in an interrogation sequence, several computer instructions may be required in order to transfer the measured and predetermined temperature values to the appropriate internal computer registers in order that their magnitudes can be compared.

When an alarm condition is established by the computer, it is usually desired that the condition be communicated to a supervisory human operator who can then determine what action should be taken. In order to provide the operator with sufficient information to determine any future action, it is desirable to make the operator aware of the interrogation step which initiated the alarm condition, rather than the individual computer instruction which actually established the condition. Moreover, it is additionally desirable for the operator to have information as to the steps in the interrogation sequence which both preceded and were to follow the step involved in the establishment of the alarm condition. The operator's console 18 of FIG. 1 receives information from the computer via line 20 and can provide information to the computer via line 22, and in accordance with the present invention functions to advise the operator of both the interrogation sequence containing the step involved in the establishment of the alarm condition and, in addition, the particular step so involved.

The operator's console 18 includes a display screen 24 and a bank of status lights and associated keys 26. As will be better understood hereinafter, the embodiment of the invention functions in response to the establishment of an alarm condition to display functional flow charts (of the type shown in FIG. 3) which advise the operator in human language terms of the particular interrogation step involved in the alarm condition.

Because of the great speed at which digital computers can operate, several different interrogation sequences can be effectively simultaneously performed, at least so far as is apparent to a human operator. In actuality, the steps of the various interrogation sequences can be processed in interleaved fashion by the computer. Because of this capability of the computer to thus effectively simultaneously perform several interrogation sequences, the bank of status lights 26 on the console 18 includes one light dedicated to each of the interrogation sequences to be processed. As will be better understood hereinafter, in response to the establishment of an alarm condition, a selected status light is illuminated and in response to the operator actuating an associated key, the screen 24 is thereafter caused to display the flow chart or portion thereof which contains the step in the interrogation sequence involved in the establishment of the alarm condition.

Prior to considering the internal construction of a typical computer 16 which can be employed in the system of FIG. 1, reference is made to Table I below which at least partially illustrates the plan of a typical stored program sequence which can be employed to monitor process 10 of FIG. 1 and operate the console 18 for the purposes described.

TABLE I
Memory

| | |
|---|---|
| Cell 00 | Executive Instruction Word— |
| Cell 01 | Executive Instruction Word— |
| Cell 02 | Executive Instruction Word— |
| Cell 03 | Executive Instruction Word—Initiate Interrogation Sequence and Jump to Cell 30. |
| . | |
| Cell 30 | Transfer I' register to R register. |
| Cell 31 | Access memory and increment counter. |
| Cell 32 | Transfer access instruction to interrogation instruction register. |
| Cell 33 | Initiate subroutine—Jump to cell identified by (SRID). |
| . | |
| Cell 70 | Subroutine #1 Instruction Word #1. |
| Cell 74 | Jump to Cell 30 or 90. |
| Cell 75 | Subroutine #2 Instruction Word #1. |
| Cell 79 | Jump to Cell 30 or 90. |
| Cell 80 | Subroutine #3 Instruction Word #1. |
| Cell 84 | Jump to Cell 30 or 90. |
| Cell 90 | Alarm Subroutine Instruction Word #1. |
| Cell 93 | Stop. |
| Cell 100 | Sequence IDA; Position ID1; Subroutine ID. |
| Cell 101 | Sequence IDB; Position ID1; Subroutine ID. |
| Cell 102 | Sequence IDC; Position ID1; Subroutine ID. |
| Cell 103 | Sequence IDD; Position ID1; Subroutine ID. |
| Cell 104 | Sequence IDA; Position ID2; Subroutine ID. |
| Cell 105 | Sequence IDB; Position ID2; Subroutine ID. |
| . | |
| Cell 199 | Jump to Cell 00. |
| Cell 200 | Data word. |
| Cell 201 | Data word. |
| Cell 202 | Data word. |
| . | Data word. |
| . | Data word. |
| . | Data word. |
| . | Data word. |
| . | Data word. |
| . | Data word. |
| . | Data word. |
| . | Data word. |
| . | Data word. |
| Cell 299 | Data word. |

Assume that the computer is provided with a memory having two hundred memory cells, identified as cell 00 through cell 199, dedicated to storing instruction words. Let it further be assumed that cells 200 through 299 store data words, such as a predetermined maximum pressure value for a steam generator. Let it still further be assumed, as is usually the case, that the instruction words are sequentially accessed from the memory in response to a number expressed by a first counter which is incremented after each accessing. Further assume that this first counter can be driven to any desired count by a jump or branching instruction which would then cause a subsequent instruction to be accessed from a cell whose position is unrelated to the cell position of the instruction word accessed immediately prior thereto.

Starting from cell 00, it is noted that the first several cells contain what are referred to as executive instruction words, which words can be used to perform various functions, as for example selectively drive particular status lights to certain indicating states. For example, each status light can be given a first color if the associated sequence is not operating. A second color can be used to indicate that the associated sequence is in standby condition and a third color to indicate periodic execution. By causing a status light to alternately flash between the third and a fourth color, an unacknowledged alarm condition can be defined. When the key associated with the flashing status light is actuated, the alarm condition is thereby acknowledged, which can then cause a slide to be displayed in the manner hereinafter described and in addition cause the status light to appear in the fourth color in a non-flashing mode. In cell 03, a particular executive instruction word is stored which says "initiate interrogation sequence" and jump to cell 30. The instruction word found in cell 30 can cause the count in a second counter to be transferred to the R or memory address register. After this transfer is performed, the instruction word in cell 31 is processed which causes the memory to be accessed and the second counter to be incremented so as to be ready to access a succeeding interrogation instruction. Interrogation instructions are illustrated as being stored in cells 100+. Each interrogation instruction corresponds to one step in an interrogation sequence and includes information which identifies the sequence (SEQID) of which it is a part and its position (POSID) in that sequence. In addition, each interrogation instruction includes subroutine identification information (SRID) which should be initiated in response thereto. Different interrogation instructions will of course define different subroutines. Certain subroutines can be very simple and can merely cause the computer to compare, for identical matching, the contents of two cells storing data words. On the other hand, a slightly more complex subroutine can compare the magnitudes of data words stored in two different cells. Still more complex subroutines can cause the magnitudes of two data words to be compared a certain predetermined number of times at certain predetermined intervals.

The instruction word subsequently accessed from cell 32 causes the interrogation instruction word previously accessed from the memory cell 31 and now held in the E or memory exchange register, to be transferred to an interrogation instruction register. In response to the instruction word accessed from cell 33, the subroutine identified by the word stored in the interrogation instruction register is initiated by jumping or branching to the cell storing the first computer instruction in the particular subroutine.

The computer instruction words in each subroutine can for example be stored in cells 70 through 99. Thus, Table I shows the first instruction word in subroutine 1 being stored in cell 70 with the succeeding subroutine 1 instruction words being stored in cells 71 through 74. Likewise, the instruction words in subroutine 2 are stored in cells 75 through 79, the instruction words in subroutine 3 in cells 80 through 84, and the instruction words of a special alarm subroutine are stored in cells 90 through 93. It should be noted that the last instruction word in each of the numbered subroutines is a jump or branching instruction which causes the succeeding instruction to be accessed from either cell 30 or cell 90. That is, after each numbered subroutine is executed, either the alarm subroutine will be initiated to establish an alarm condition or the succeeding interrogation instruction will be processed. It should be appreciated that in the processing of each subroutine, access to the data words stored in cells 200+ will often be required. After all of the interrogation instruction words have been processed, the contents of cell 199 will be accessed in the course of performing the instruction word accessed from cell 31. Cell 199 stores a jump instruction which forces the first counter back to cell 00 to cause the entire monitoring procedure to be repeated.

Figure 2:
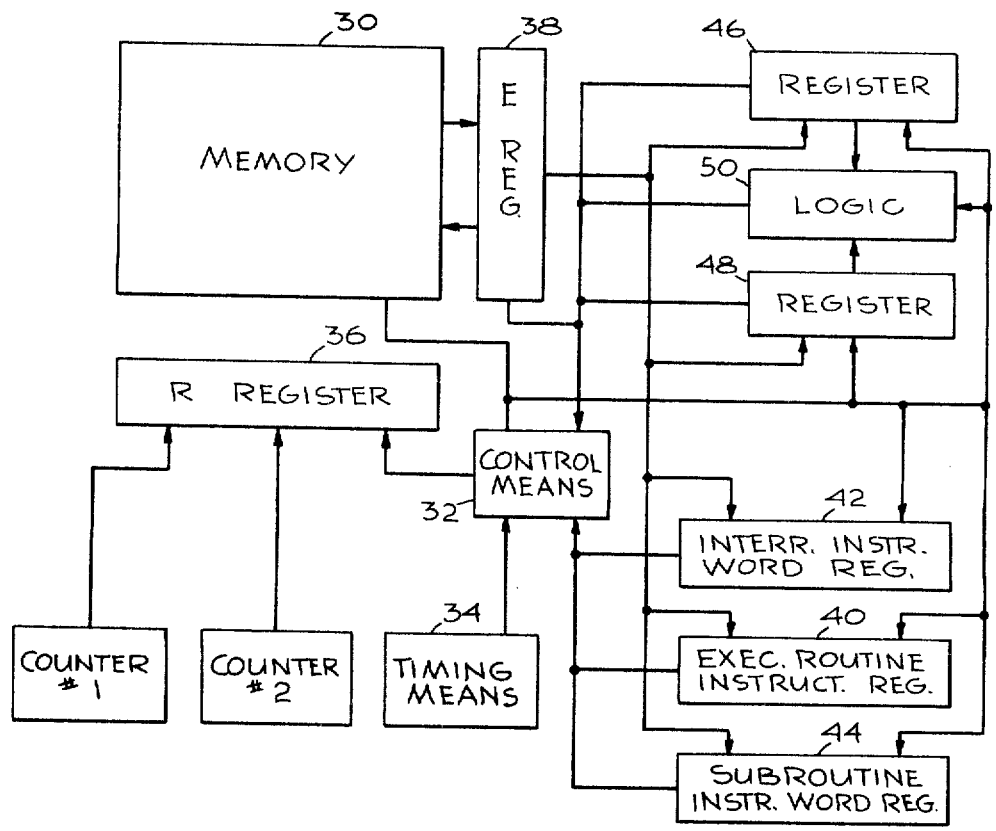
FIGURE 2 is a block diagram of a digital computer organization suitable for use in the system of FIG. 1.

Attention is now called to FIG. 2 which illustrates in block form a general internal organization of the computer 16 of FIG. 1. The computer includes a digital memory 30 and a control means 32 adapted to define phases during which words are either written into or read from the memory 30. The control means 32 provides appropriate control signals in response to information stored in various registers, to be mentioned, and in response to clock signals provided by a timing means 34. Directly associated with the memory 30 is a pair of digital storage registers; i.e. an R register 36 and an E register 38. The E register 38 is a memory exchange register and serves to store information which is to be written into the memory and information which has been accessed from the memory. Whether information is written into or read from the memory 30 is controlled by the control means 32. The particular memory location from which information is accessed or into which information is written is defined by an address held in the memory address or R register 36. Information can be entered into the R register from either of the previously referred to counters under the control of control means 32.

Information accessed from the memory 30 and entered into the E register 38 can be transferred to any one of several other registers under the control of control means 32. Thus, assuming that an executive routine instruction word is accessed from the memory, the control means 32 can recognize the word while it is stored in the E register 38 and subsequently transfer it to the executive routine instruction word register 40. Thereafter, the control means 32 can respond to the word in the register 40 to perform operations directed thereby. Similarly, other instruction words can be transferred from the E register 38 to the interrogation instruction word register 42 or to the subroutine instruction word register 44 as is appropriate. The interrogation instruction word register 42 has been previously referred to with reference to Table I when it was indicated that the instruction word accessed from cell 33 caused a subroutine to be initiated in response to the word stored in the interrogation instruction word register. The subroutine instruction words subsequently accessed are entered into the register 44 and in response thereto the control means 32 operates on appropriate data words which can be entered into registers 46 and 48 and while therein, operated upon by logic circuit 50 controlled by control means 32. The logic circuit 50 can, as aforementioned, appropriately compare the words in the registers 46 and 48.

Thus far, the functions performed by the computer have been only generally considered. Attention is now called to FIG. 3 which illustrates a typical flow chart representing a portion of an interrogation sequence forming part of the pre-start-up procedure in an electric power generating station. Essentially, each interrogation or step in the sequence involves merely making a binary decision based upon certain criteria. The criteria for each interrogation can be unique. For example, the first interrogation in the sequence represented in FIG. 3 merely involves determining whether the "load-connected" switch is off. If this switch is off, or in other words if the interrogation is answered affirmatively, the computer proceeds in the manner previously described to the next interrogation which herein involves seeing whether the gland steam condition level is normal. If the interrogation is again answered affirmatively, the computer proceeds to the next interrogation. If any of the interrogations are answered negatively, then an alarm condition is established. The criteria for the various interrogations can be different and thus, whereas the initial interrogation merely involved determining whether a particular switch was closed or open, interrogation 23 in the sequence illustrated in FIG. 3 involves comparing the magnitude of a measured variable with the magnitude of a stored predetermined value. As noted, other criteria may involve making magnitude comparisons a certain number of times spaced in time by a certain interval.

Figure 3:
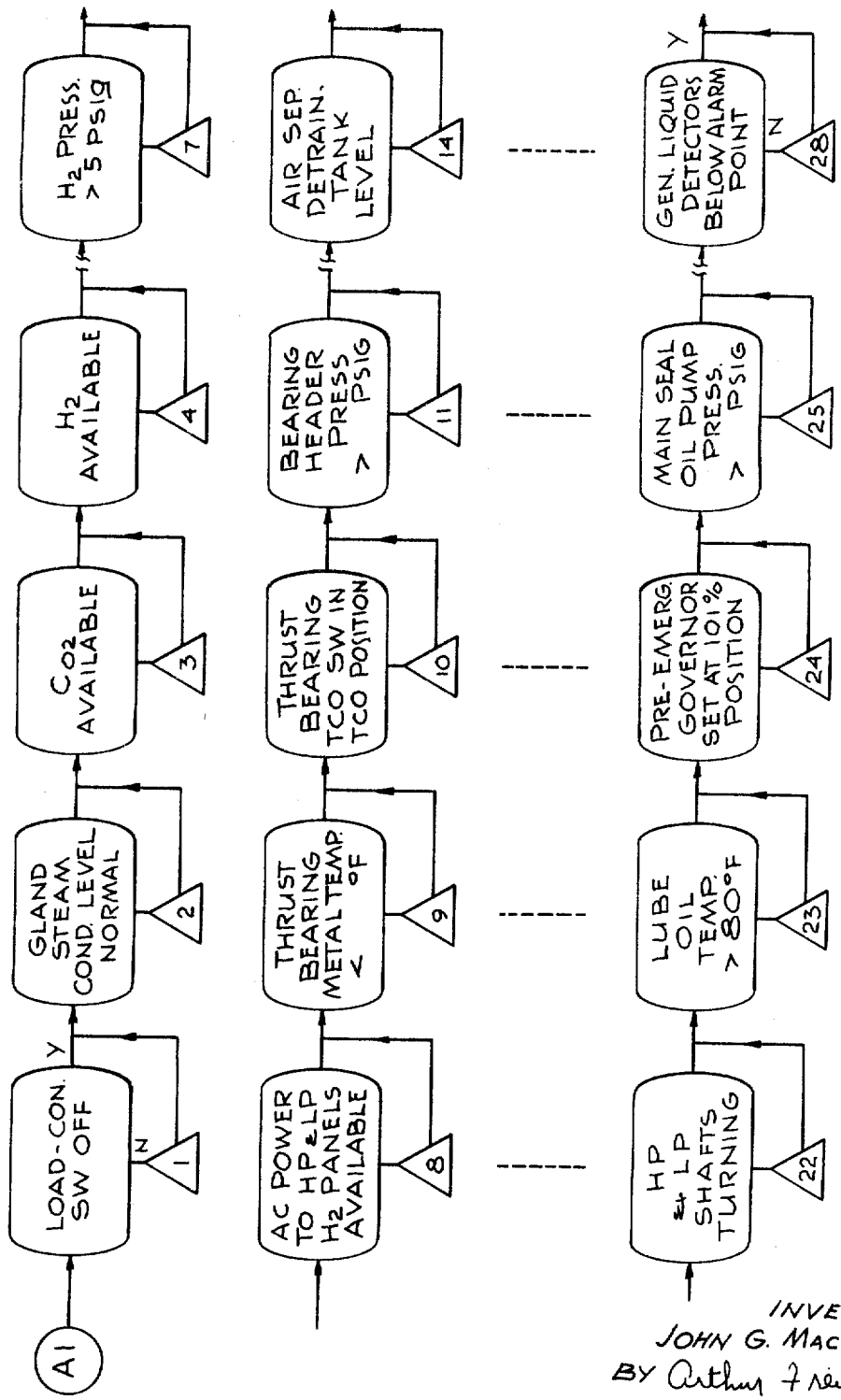
FIGURE 3 is a front view of a portion of a transparency illustrating a flow chart representing a typical interrogation sequence, or portion thereof, for comparing process variables with predetermined values.

From what has been said thus far, it should be apparent that each of the interrogation steps in the sequence illustrated in FIG. 3 involves the processing of a plurality of computer instruction words. It should also be realized that in response to each and every one of the interrogations, an alarm condition can be established whenever the response to a particular interrogation is negative, regardless of the particular criteria involved in the interrogation. When an alarm condition is established, in order to enable an operator to most efficiently clear the alarm condition, it is necessary for him to be aware of the affirmative interrogations which have preceded the alarming interrogation and preferably the interrogations which are intended to follow the alarming interrogation. Whereas the computer can merely print out data identifying the particular interrogation which would enable the operator to consult a master book of flow charts to secure information with respect to preceding and subsequent interrgotions, in accordance with the present invention, the alarm condition is indicated by the corresponding status light and in response to the operator actuating the associated key, the appropriate flow chart is displayed on the screen 24 of the console 18.

In order to display the appropriate flow chart, a slide transparency is prepared for each interrogation sequence and in the case of certain long sequences, more than one slide transparency might have to be provided. In any event, each slide transparency has represented thereon at least a portion of a flow chart of the type shown in FIG. 3 which has indicia thereon understandable in human language terms explaining the function performed by each interrogation. Thus, by displaying the appropriate slide transparency to the operator, and by providing means for distinguishing the alarming interrogation, the operator immediately is informed of the interrogations which preceded and which are to follow the alarming interrogation.

Figure 4:
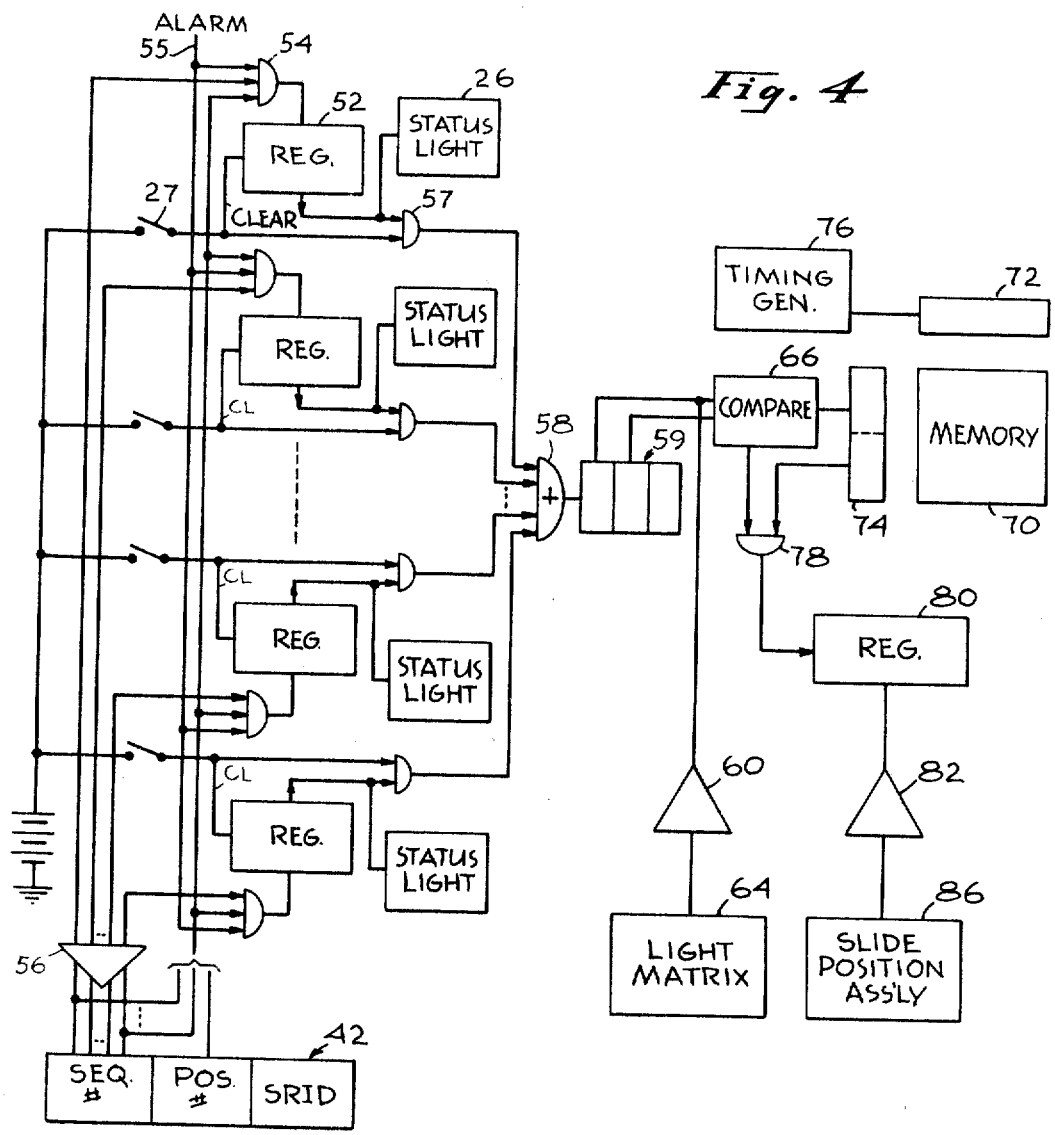
FIGURE 4 is a block diagram of an apparatus responsive to the establishment of an alarm condition by the computer of FIG. 1 for causing a flow chart, of the type shown in FIG. 3, to be displayed for the operation.

Attention is now called to FIG. 4 which illustrates a portion of the apparatus responsive to the establishment of an alarm condition. It will be recalled that the interrogation instruction register 42 at all times stores the interrogation instruction word being processed. It will further be recalled that each interrogation instruction word contains information which identifies both the interrogation sequence of which it is a part and its position in that sequence. In addition, of course, each interrogation instruction word includes a subroutine identification number (SRID) which causes an appropriate subroutine to be performed. Each subroutine manipulates certain data according to criteria specified in the subroutine, resulting in either the establishment of an alarm condition or proceeding to the processing of a subsequent interrogation instruction word.

A different storage register 52 is provided for each different interrogation sequence for the purpose of storing information identifying the position in the sequence of an alarming interrogation. The input to each register 52 is derived from the output of a different AND gate 54. An alarm signal line 55 is connected to the input of all of the gates 54. An alarm signal is developed on line 55 in response to an alarm condition being established. A second input common to all of the gates 54 is derived from the portions of the register 42 storing the interrogation sequence and position information. The third input to each of the AND gates 54 is derived from a different output terminal of decoder 56 which is responsive to the interrogation sequence information stored in register 42. Thus, whenever an alarm signal is applied to line 55, the interrogation sequence and position information is transferred from register 42 to the particular register 52 corresponding to the interrogation sequence. Although it should be appreciated that the sequence information does not actually have to be transferred into the registers 52 because it is always the same for any particular register, for the sake of clarity, the transfer of the sequence information will be assumed herein.

Each register 52 is coupled to the status light which is dedicated to the same interrogation sequence and in response to information being entered into a register 52, the status light is caused to alternately flash the previously mentioned third and fourth colors to define an unacknowledged alarm condition. Inasmuch as the processing of other sequences can continue after an alarm condition is established with respect to one sequence, several of the status lights can flash simultaneously. Thus, by monitoring the bank of status lights, an operator is able to very quickly glean an overall impression of the condition of the process.

As previously noted, once an operator is made aware that an alarm condition exists, he is usually desirous of ascertaining which particular interrogation initiated the alarm and which interrogations preceded and are to follow the alarming interrogation. In order to ascertain this information, the operator can acknowledge the alarm condition by actuating the key 27 corresponding to the flashing status light. Actuation of a key clears the corresponding register 52 and transfers the information stored therein through an AND gate 57 and an OR gate 58 to a register 59. It also causes the corresponding status light to define an alarm acknowledged state. Subsequently, the appropriate slide transparency is displayed.

The portion of the register 59 storing the interrogation position information is connected to the input of a decoding circuit 60 whose output is connected to the input of a light matrix 64. The light matrix 64 includes a plurality of lights each of which is positioned so as to correspond to a different interrogation position so that a particular interrogation position can be identified by energizing the corresponding light. Thus, assuming that each slide transparency can represent 28 different interrogations as shown in FIG. 3, then the light matrix 64 should correspondingly have 28 lights each energizable by a different code appearing in the position portion of the register 59.

In addition to the register 59 containing position information, information identifying the particular sequence of which each interrogation forms a part is provided. Both the sequence and position information are applied to a compare circuit 66. The sequence and position information is compared with entries in a memory table 70 which stores information identifying which particular slide transparency carries each sequence portion. The memory table 70 has an address register 72 and exchange register 74 associated therewith. The address register 72 is incremented by pulses provided by a timing generator 76 to thereby successively cause the sequence and position information of each entry in the table 70 to be entered into the register 74 and compared with the sequence and position information stored in register 59. The compare circuit 66 will provide an enabling signal to gating circuit 78 when the entry in table 70 which includes the interrogation identified in register 42 is accessed from the memory table 70. When gate 78 is enabled, the corresponding information identifying a particular slide transparency is transferred from the register 74 to a register 80. As a consequence, decoding circuit 82 provides a signal to a slide positioning assembly 86.

Figure 5:
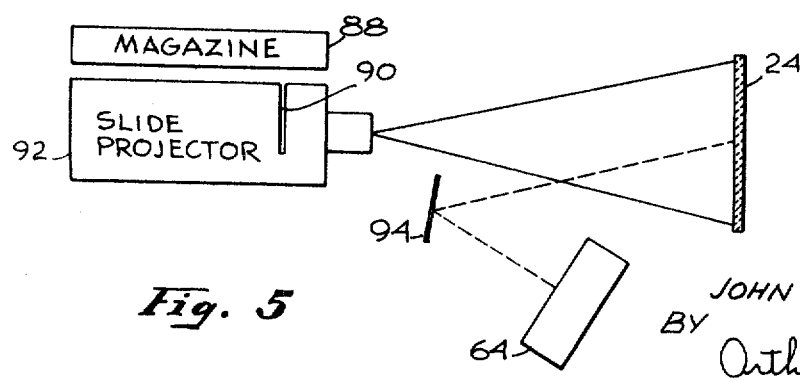
FIGURE 5 is a block diagram of apparatus responsive to the apparatus of FIG. 4, for displaying a slide transparency of the type illustrated in FIG. 3.

The slide positioning assembly 86 can comprise a conventional linear positioning motor having a plurality of input taps each of which is coupled to a different output terminal of decoding circuit 82. In response to a signal provided on an output terminal of decoding circuit 82, the motor is driven to a unique position. The motor is coupled to the magazine 88 of FIG. 5 which stores all of the system slide transparencies. The slide positioning assembly 86 can thus position the magazine 88 to align the identified slide transparency with an entrance opening 90 on a slide projector 92 to thus display the information on the slide on the screen 24 of console 18. A mirror 94 is preferably supported in opposed relationship to the light matrix 64 and in response to each light therein being energized, causes a light spot to be reflected at the proper point on the screen 24 to thereby identify a particular interrogation.

Thus, the console 18 initially provides, via status lights 26, information which identifies for the operator the alarming interrogation sequence or sequences. The operator can then decide which alarm condition is more significant and by acknowledging that alarm condition, cause information to be provided on the screen 24, which identifies the particular alarming interrogation and, in addition, the interrogations which preceded and are to follow the alarming interrogation. After the operator then takes whatever action he deems necessary, he can consider the second alarm condition in detail.

Although certain structural configurations such as a slide projector system using discrete slides stored in a magazine positioned by a linear motor, have been specifically mentioned herein, it should be understood that equivalent structures are also contemplated. Thus, for example, an endless film loop could of course be substituted for the discrete slide system and a rotary motor responsive to the decoding circuit 82 output could be employed. Also, a variety of indicating means other than the light matrix 64 could of course be used to identify a particular interrogation.

The embodiments of the invention in which an exclusive property or privilege is claimed are defined as follows:

1. In combination with a system including a plurality of quantatively determinable variables and apparatus for performing a plurality of interrogation sequences, each sequence comprised of serially comparing certain ones of said variables with values stored by said apparatus in accordance with corresponding criteria also stored by said apparatus, and for establishing an alarm condition whenever a comparison violates the corresponding criteria;

display means for visually displaying each different interrogation sequence in terms of human language indicia and for indicating the particular variable to be compared during each step of the sequence;

control means responsive to the establishment of said alarm condition for generating signals identifying both the violated comparison and the interrogation sequence in which it is contained; and means responsive to said generated signals for causing said display means to display said identified interrogation sequence and for visually distinguishing the indicia thereon describing said identified comparison from all other indicia.

2. In combination with a system including a plurality of quantatively determinable variables and digital apparatus for performing a plurality of interrogation sequences, each sequence comprised of serially comparing certain ones of said variables with values stored by said digital apparatus in accordance with corresponding criteria stored by said digital apparatus, and for establishing an alarm condition whenever a comparison violates the corresponding criteria;

display means for visually displaying a different chart corresponding to each different interrogation sequence or portion thereof which charts have indicia thereon describing in human language the particular variable to be compared during each step of the sequence;

control means responsive to the establishment of said alarm condition for generating signals identifying both the violated comparison and the interrogation sequence in which it is contained;

said display means responsive to said generated signals for displaying the chart corresponding to the identified interrogation sequence; and means responsive to said generated signals for visually distinguishing the indicia describing said identified comparison from all other indicia on said displayed chart.

3. The combination of claim 2 wherein said display means includes a plurality of transparencies, each carrying one of said charts thereon; and means responsive to said generated signals for displaying the transparency carrying said chart corresponding to the identified interrogation sequence.

4. The combination of claim 2 wherein said display means includes a plurality of slide transparencies, each carrying one of said charts thereon;
- a digital memory having stored therein information identifying each of said interrogation sequence portions corresponding to a different chart and having associated therewith information identifying the slide carrying each chart;
- means responsive to said generated signals for deriving signals from said digital memory identifying the slide carrying the chart corresponding to the interrogation sequence portion containing the violated comparison; and
- means responsive to said derived signals for displaying the identified slide.

5. Digital computer apparatus including a memory storing a plurality of data words and a plurality of instruction word sequences, each sequence including a plurality of instruction words;
- means serially responsive to said stored instruction words for performing operations identified by said instruction words on said data words;
- means responsive to certain ones of said instruction words and to results of certain ones of said operations for establishing an alarm condition;
- display means for visually displaying a different chart corresponding to each different instruction word sequence or portion thereof which charts have indicia thereon describing in human language the function of each instruction word;
- control means responsive to the establishment of said alarm condition for generating signals identifying the particular instruction word in response to which said alarm condition was established;
- said display means responsive to said generated signals for displaying the chart corresponding to the instruction word sequence including the particular instruction word in response to which said alarm condition was established; and
- means responsive to said generated signals for visually distinguishing the indicia describing said identified instruction word from all other indicia on said displayed chart.

6. The apparatus of claim 5 including a plurality of status indicators, each different status indicator corresponding to a different one of said instruction word sequences; and
- means responsive to certain ones of said instruction words for controlling said status indicators to indicate that status of the sequence corresponding thereto.

7. The combination of claim 5 wherein said display means includes a plurality of transparencies, each carrying one of said charts thereon; and
- means responsive to said generated signals for displaying the transparency carrying said chart corresponding to the identified instruction word sequence.

8. The combination of claim 5 wherein said display means includes a plurality of slide transparencies, each carrying one of said charts thereon;
- a second digital memory having stored therein information identifying each of said instruction word sequence portions corresponding to a different chart and having associated therewith information identifying the slide carrying each chart;
- means responsive to said generated signals for deriving signals from said second digital memory identifying the slide carrying the chart corresponding to the instruction word sequence portion containing the instruction word in response to which said alarm condition was established; and
- means responsive to said derived signals for displaying the identified slide.

9. In combination with a system including a plurality of quantatively determinable variables and apparatus for performing a plurality of interrogation sequences, each sequence comprised of serially comparing certain ones of said variables with values stored by said apparatus in accordance with corresponding criteria stored by said apparatus, and for establishing an alarm condition whenever a comparison violates the corresponding criteria;
- a plurality of status indicators each corresponding to a different one of said interrogation sequences; and
- means responsive to the establishment of an alarm condition for actuating the status indicator corresponding to the sequence containing the violated comparison.

10. In combination with a system including a plurality of quantatively determinable variables and digital apparatus for performing a plurality of interrogation sequences, each sequence comprised of serially comparing certain ones of said variables with values stored by said digital apparatus in accordance with corresponding criteria stored by said digital apparatus, and for establishing an alarm condition whenever a comparison violates the corresponding criteria;
- a plurality of status indicators each corresponding to a different one of said interrogation sequences;
- means responsive to the establishment of an alarm condition for actuating the status indicator corresponding to the sequence containing the violated comparison;
- a plurality of actuating means each corresponding to a different one of said status indicators; and
- means responsive to the actuation of each of said actuating means corresponding to an actuated status indicator for displaying at least a portion of the interrogation sequence containing the violated comparison and for identifying the violated comparison.

11. Digital computer apparatus including a memory storing a plurality of data words and a plurality of instruction word sequences, each sequence including a plurality of instruction words;
- means serially responsive to said stored instruction words for performing operations identified by said instruction words on said data words;
- means responsive to certain ones of said instruction words and to results of certain ones of said operations for establishing an alarm condition;
- a plurality of status indicators each corresponding to a different one of said instruction word sequences; and
- means responsive to the establishment of an alarm condition for actutaing the status indicator corresponding to the sequence containing the instruction word in response to which said alarm condition was established.

12. Digital computer apparatus including a memory storing a plurality of data words and a plurality of instruction word sequences, each sequence including a plurality of instruction words;
- means serially responsive to said stored instruction words for performing operations identified by said instruction words on said data words;
- means responsive to certain ones of said instruction words and to results of certain ones of said operations for establishing an alarm condition;
- a plurality of status indicators each corresponding to a different one of said instruction word sequences;
- means responsive to the establishment of an alarm condition for actuating the status indicator corresponding to the sequence containing the instruction word in response to which said alarm condition was established;
- display means for visually displaying a different chart corresponding to each different instruction word sequence or portion thereof which charts have indicia thereon describing in human language the function of each instruction word;
- a plurality of actuating means each corresponding to a different one of said status indicators;

control means responsive to the actuation of each of said actuating means corresponding to an actuated status indicator for generating signals identifying the particular instruction word in response to which said alarm condition was established;

said display means responsive to said generated signals for displaying the chart corresponding to the instruction word sequence including the particular instruction word in response to which said alarm condition was established; and means responsive to said generated signals for visually distinguishing the indicia describing said identified instruction word from all other indicia on said displayed chart.

13. The combination of claim 12 wherein said display means includes a plurality of transparencies, each carrying one of said charts thereon;

a second digital memory having stored therein information identifying each of said instruction word sequence portions corresponding to a different chart and having associated therewith information identifying the transparency carrying each chart;

means responsive to said generated signals for deriving signals from said second digital memory identifying the transparency carrying the chart corresponding to the instruction word sequence portion containing the instruction word in response to which said alarm condition was established; and means responsive to said derived signals for displaying the identified transparency.

References Cited

UNITED STATES PATENTS

| | | |
|---|---|---|
| 2,922,990 | 1/1960 | Anderson. |
| 3,265,873 | 9/1966 | Sawyer _____ 235—151.1 |

ROBERT C. BAILEY, *Primary Examiner.*

G. D. SHAW, *Assistant Examiner.*